Oct. 19, 1965     C. W. RANSON     3,212,758
FRUIT AND VEGETABLE WASHING DEVICE WITH VERTICAL
CIRCULATIVE FLOW AND LATERAL OVERFLOW PORTS
Original Filed Jan. 14, 1963

United States Patent Office 3,212,758
Patented Oct. 19, 1965

3,212,758
FRUIT AND VEGETABLE WASHING DEVICE WITH VERTICAL CIRCULATIVE FLOW AND LATERAL OVERFLOW PORTS
Charles W. Ranson, 7906 Agnew Ave., Los Angeles, Calif.
Continuation of application Ser. No. 251,400, Jan. 14, 1963. This application Apr. 5, 1965, Ser. No. 446,791
6 Claims. (Cl. 259—36)

This is a continuation of application Serial No. 251,400 filed Jan. 14, 1963, now abandoned. The present invention relates to a washing device for fruits, vegetables, and other solid food units. The device provides for imparting to contained liquid a two dimensional circulative flow in a vertical plane. Provision is included for the circulative liquid flow to receive sufficient kinetic energy from tangential inlet liquid flow to effect continuous vertical circulative motion of the fruits or vegetables.

Objects of the invention are to provide for the thorough cleaning of all surface areas of fruits and vegetables in minimum time and without bruises or damage.

Other objects are to provide a simple cleaning device having no moving mechanical parts, and which can be used conveniently in household kitchen sinks, and which can utilize kinetic energy available from conventional household faucet water.

Another object is to prevent the loss overboard of circulating food units during the copious overflow of exhaust liquid.

Another object is to eliminate the need and cost of a lid or closure unit which heretofore was necessary under some operation conditions to prevent the loss overboard of circulating food units.

Another object is to provide greater convenience of operation by eliminating the need for storing and handling a covering element which heretofore was useful under specific operating condtiions.

Another object is to minimize back pressure on the liquid flow system to provide maximum rates of inlet flow, washing, rinsing, and dilution of impurities.

Another object is to provide in the side walls of the washing device numerous exhaust ports of small sizes to block the loss overboard of small berries and arranged in a specific pattern to prevent port blockage by berries and other food units during operation.

Another object is to provide in the side walls of the device numerous small exhaust ports arranged in horizontal strata of port sizes and spacing to provide an operating water level insensitive to available water faucet pressure and to provide a consistently large water volume for washing.

Other objects and advantages will become apparent as the description proceeds.

One form of the present invention is illustrated in the accompanying drawings wherein similar numerals refer to similar parts throughout the views.

Figure 1:
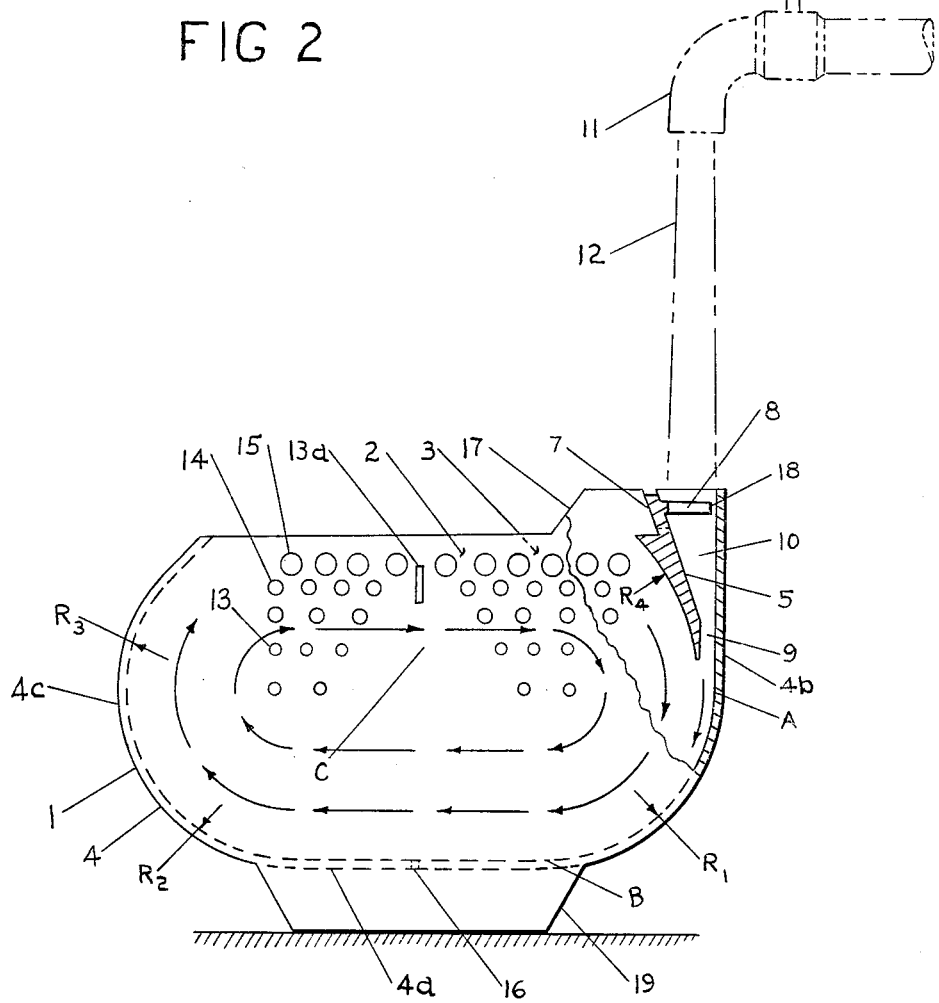

FIGURE 1 is a side view of the fruit and vegetable washing device properly positioned beneath an open water faucet. The arrows indicate the flow path of the circulative liquid flow. The broken section of FIGURE 1 is a view along line 3—3 of FIGURE 2.

Figure 2:
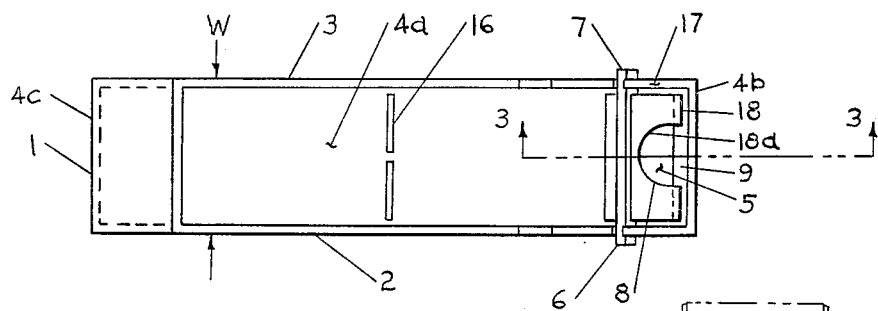

FIGURE 2 is a plan view of FIGURE 1 showing the comparatively narrow width of the washing device.

The washing of fruits and vegetables in actual kitchen practice has heretofore been accomplished by the use of a colander, a conventional kitchen pan, or by hand rubbing under an open faucet.

The colander is a bowl shaped sieve with a base. For food washing purposes, the colander is held under an open faucet while containing a pile of food units. The bulk of the water follows the path of least resistance and flows around rather than through the pile of food units. The velocity of the water seeping between the food units is low due to resistance so that liquid scouring and dissolving action is relatively inefficient and slow. Also the food units lie static so that areas of mutual contact and areas of contact with the container receive no washing.

The conventional kitchen pan is generally used for washing by filling the bottom of the pan with food units and most of the remainder with water. The pan is then shaken by hand to simulate the action of a tumbling barrel. The cleaning action is highly erratic and inconsistent. Rinsing is only partial as the liquid is poured out. Bruises and surface damage can be done to berries and delicate skin fruits by the shifting weight of the total load.

The prior art has also provided a narrow, two dimensional washing device of the type described herein. This device is described in my copending application of Serial No. 246,715 filed Dec. 24, 1962. Said prior device while provinding distinct improvements and advantages requires a lid or closure element for satisfactory operation under certain conditions of liquid flow rates and types, sizes, and amounts of food units being washed. The present device eliminates the need and therefore the cost and operating inconvenience of a lid or closure unit.

The present invention improves upon the prior art and provides advantages as set forth by the above statements of objectives.

Referring to the several figures, washing device 1 is comprised of side walls 2 and 3 extending longitudinally and vertically and spaced apart in relative proximity. A lateral wall 4 extends between side walls 2 and 3 to provide a bottom wall 4a and two opposite end walls 4b and 4c. The bottom wall 4a and end wall 4b are faired together by radius $R_1$ to provide a curved inner surface, as shown.

The inner surface of end wall 4b extends vertically above point A which is the point of tangency with radius $R_1$. Point B indicates the lower point of tangency with radius $R_1$. Other portions of lateral side wall 4 are curved and faired as indicated by radii $R_2$ and $R_3$. The internal surface of lateral side wall 4 provides a smooth, curved perimeter flow path for contained liquid.

Washing device 1 includes a liquid inlet portion or unit 5 which fastens to side walls 2 and 3 by ears 6 and 7 which engage corresponding notches in the side walls. Inlet unit 5 includes an upper admission port portion 8, a normally submerged exit port portion 9, and an interconnecting duct portion 10. Liquid inlet unit 5 is shown as a form which cooperates with portions of end wall 4b and side walls 2 and 3 to provide inlet ducting. Exit port portion 9 provides an elongated slot which discharges a sheet of inlet liquid into a device 1 with flow substantially tangential to the surface at radius $R_1$ The inlet flow continues with a smooth transition to a curved flow path below point of tangency A.

For operation, the device is partially filled with fruits or vegetables or other food units and placed under an open faucet. Device 1 is positioned so that water jet 12 enters upper admission port portion 8. The water jet passes through duct portion 10 and exit port portion 9 entering the container portion of the washing device. The water jet enters adjacent to end wall 4b, passes tangent point A and is guided by the surface at $R_1$ into a circulative path. The liquid is further directed into a circulative path by the surfaces at radii $R_2$ and $R_3$ as well as the inclined or curved surface at radius $R_4$ of the inlet unit. The established flow path is in accordance with the arrows shown in FIGURE 1. The liquid major exhaust occurs through numerous small apertures 13, 14, and 15 in side walls 2 and 3. The apertures are positioned inwardly a distance from end walls 4b and 4c to prevent dissipation of kinetic energy from the initial inlet jet moving along side wall 4. Auxiliary exhaust ports 16 in bottom wall 4a provide for the continuous exhausting of small liquid jets to carry away non-soluble sand and grit.

Washing device 1 contains liquid vertically within a width, $W_1$ of relatively narrow proportions as shown in FIGURE 2. This lateral confinement provides for two dimensional liquid flow in a vertical plane. The circulative flow pattern is induced by the tangential inlet jet and the curved inner surfaces of the lateral side wall, FIGURE 1. Two dimensional confinement contributes greatly to liquid flow control and reduces dissipation of kinetic energy from lateral flow and turbulence.

As stated above, the side walls 2 and 3 are in the state of being mutually near. This side wall proximity endows the washing device with a width less than the length or height of each. The device has been found to be operable using conventional household faucets and a reasonable container volume when width $W_1$ is about one half or less of the length or height of the device. As the width of the device is decreased with respect to the length or height the efficiency and load capacity increase. When the width of the device is relatively large with respect to the length or height the circulative two dimensional flow pattern is not obtained, but localized random liquid agitation occurs at the region of faucet water entry. This results in erratic and negligible washing action. The specific side wall proximity required for satisfactory performance of any given installation depends upon a number of variables including the liquid mass flow rate, the height and length of the device, the internal contours of the device, the densities and dimensions of the food units to be cleaned, and the size of the wash load.

The kinetic energy of the inlet jet is conserved by the relatively large proportions of radii $R_1$, $R_2$, $R_3$, and $R_4$, and by the substantially two dimensional liquid flow pattern. The overflow liquid is of low velocity and low kinetic energy loss. Viscosity functions to maintain the entire liquid body in a state of circulative flow.

The two dimensional circulative liquid flow in a vertical plane imparts similar circulative motion to contained food units. The submerged food units are buoyed by forces equal to the weights of the displaced liquid. Consequently only a relatively small amount of liquid drag force is required to lift a given food unit vertically against the gravity force. The drag force of a solid body in non-laminar liquid flow is proportioned to the relative velocity squared. Hence, by constructing washing device 1 as described to conserve kinetic energy and to maintain high liquid rotative velocity, the food units are forced to rise and circulate with the liquid. Food unit circulative washing has been achieved using the water jet from conventional household faucets. It was found that the food units experience local tumbling as they move in general circulative flow. This tumbling action adds to the liquid scouring effect and to the cleaning by mutual atttrition between food units.

During operation of the washing device, insecticides, fungicides, and other chemicals and soil particles are progressively removed from food units by a continuously diluting liquid flow. The impurities are carried away in the bulk liquid overflow through narrow exhaust apertures 13, 14, and 15. The exhaust apertures are generally circular or elongated and are small or narrow to block the egress of small berries, etc. Similarly, if a screen-like construction is substituted, the spaces of the network are narrow. Slot 13a is a narrow elongated aperture and illustrates a more common concept of the term narrow. The openings in side wall 3 are similar to those shown in side wall 2 of FIGURE 1. The exhaust apertures 13, 14, and 15 are numerous to provide a large total exhaust area so that the liquid head above the apertures at full faucet opening is short and the exhaust flow per unit area is low. The differential liquid pressure across an aperture is therefore small and the corresponding force tending to hold a lodged berry against an aperture is also small. Consequently, berries and some other food units tend to stick to the apertures and to block liquid exhaust flow, but only to a moderate degree. In tests it has been determined that the kinetic energy of the circulative liquid flow of the present device is adequate to pull away berries lodged at exhaust apertures, except in the central region C of the device, indicated in FIGURE 1. The circulative liquid flow is in the nature of a vortex except that the input energy is applied tangentially at the outer boundary The action of viscosity on adjacent layers of liquid transmits rotation to the entire liquid mass. The liquid velocity and kinetic energy are greatest at the outer liquid boundary. The liquid velocity reduces approximately linearly to the core of the rotative flow. The kinetic energy reduces in proportion to the velocity squared. Thus at the core of the rotative liquid the kinetic energy has been found inadequate to pull away lodged berries at apertures. Consequently, the core region C of the circulative liquid has not been provided with exhaust apertures. Side walls 2 and 3 are solid at region C. With this aperture configuration the device has been operated successfully in tests with various types and sizes of food units without blockage of exhaust apertures occurring.

In order to wash with large liquid volume and simultaneously accommodate various faucet sizes and water pressures it is desirable to provide various sizes of exhaust apertures at various zone elevations. For example, in FIGURE 1, apertures 13 are at a low elevation and are of the smallest diameter, i.e., three thirty-seconds of an inch. Apertures 14 are at an intermediate elevation and are of an intermediate diameter, i.e., four thirty-seconds of an inch. Apertures 15 are at the highest elevation and are of the maximum diameter, i.e., five thirty-seconds of an inch. This arrangement provides that increases in inlet flow rates result in matched outflow rates with only little gain in stabilized liquid volume. Consequently, the liquid level within the device is insensitive to liquid inflow rates. Thus, nearly the full volume of the device can be utilized for washing whether the water faucet pressure is high or low. The horizontal rows of apertures increase in length and decrease in vertical spacing at higher elevations, and the spacings of apertures in horizontal rows are closer at higher elevation for similar purpose. Thus the apertures are arranged for progressively increasing integrated aperture area in horizontal zones with increasing elevation.

Whereas the bulk of the exhaust liquid flows through apertures 13, 14, and 15, a relatively small amount of exhaust liquid flows through auxiliary exhaust ports 16 in bottom wall 4a. Heavier nonsoluble impurities are discharged through auxiliary exhaust ports 16 as the impurities are swept by liquid along the surface of bottom wall 4a. Ports 16 by the removal of the liquid boundary layer retard the formation of turbulence and improve efficiency by conserving kinetic energy of the main liquid flow. When faucet 11 is closed, drainage occurs automatically through ports 16 permitting food units conveniently to be poured from spout 17 without liquid. Inlet portion of unit 5 may be easily removed prior to pouring.

Inlet unit 5 is provided with a lip 18 which extends horizontally and functions as a splash shield to reduce the amount of inlet water splashing. The inlet duct below lip 18 serves as an anti-splash chamber. Lip 18 has a curved portion 18a which serves to grip an optional liquid conduit, not shown, which may be extended from faucet 11 to provide a modified mode of operation.

Inlet unit or portion 5 may be separable from washing device 1, or the inlet portion may be bonded or otherwise integrally associated with the washing device within the scope of the invention. Similarly the inlet portion or unit may be separable into sections which combine in use to perform as described.

The washing device rests on spaced parallel skids 19 to provide elevation clearance for the liquid jet ejecting from auxiliary exhaust ports 16.

While one embodiment of the present invention has been illustrated it is to be understood that what is defined by Letters Patent is specified by the appended claims.

What is claimed is:

1. A washing device comprising two side walls extending longitudinally and vertically and spaced apart, a lateral wall extending between said side walls to provide a bottom wall and two opposite end walls and connecting with said side walls in unitary relation, and the inner surface of said bottom wall and the inner surface of at least one of said end walls substantially faired to provide a substantially curved inner surface at the region of juncture, and at least one of said side walls provided with a plurality of narrow apertures, and said apertures located upwardly and substantially centrally in said side wall except for a relatively local center region.

2. A washing device comprising two side walls extending longitudinally and vertically and spaced apart, a lateral wall extending between said side walls to provide a bottom wall and two opposite end walls and connecting with said side walls in unitary relation, and the inner surface of said bottom wall and the inner surface of at least one of said end walls substantially faired to provide a substantially curved inner surface at the region of juncture, and at least one of said side walls provided with a plurality of narrow apertures, and said apertures distributed vertically, and the lower apertures being narrow generally, and the upper apertures being relatively less narrow generally.

3. A washing device comprising two side walls extending longitudinally and vertically and spaced apart, a lateral wall extending between said side walls to provide a bottom wall and two opposite end walls and connecting with said side walls in unitary relation, and the inner surface of said bottom wall and the inner surface of at least one of said end walls substantially faired to provide a substantially curved inner surface at the region of juncture, and at least one of said side walls provided with a plurality of narrow apertures, and said apertures distributed vertically, and the upper apertures being arranged in greater density generally than the lower apertures.

4. A washing device comprising two side walls extending longitudinally and vertically and spaced apart, a lateral wall extending between said side walls to provide a bottom wall and two opposite ends walls and connecting with said side walls in unitary relation, and the inner surface of said bottom wall and the inner surface of at least one of said end walls substantially faired to provide a substantially curved inner surface at the region of juncture, and at least one of said side walls provided with a plurality of narrow apertures, and said apertures distributed vertically, and the upper apertures having greater area density generally than the lower apertures.

5. A washing device comprising two side walls extending longitudinally and vertically and spaced apart, a lateral wall extending between said side walls to provide a bottom wall and two opposite end walls and connecting with said side walls in unitary relation, and the inner surface of said bottom wall and the inner surface of at least one of said end walls substantially faired to provide a substantially curved inner surface at the region of juncture, and at least one of said side walls provided with a plurality of narrow apertures, and said apertures being distributed vertically, and said apertures arranged for progressively increasing integrated aperture area in horizontal zones with increasing elevation.

6. A washing device comprising two side walls extending longitudinally and vertically and spaced apart, a lateral wall extending between said side walls to provide a bottom wall and two opposite end walls and connecting with said side walls in unitary relation to provide a container portion, and the inner surface of said bottom wall and the inner surface of at least one of said end walls substantially faired to provide a substantially curved inner surface at the region of juncture, and at least one of said side walls provided with a plurality of narrow apertures, and said apertures located upwardly in said side wall except generally in a local end zone adjacent to the end wall opposite to said substantially faired end wall, and said generally non-apertured end zone in said side wall extending from said end wall a distance greater than one fourth of the width of the container portion of the device.

References Cited by the Examiner

UNITED STATES PATENTS 1,245,768  11/17  Randall _____ 259—36

FOREIGN PATENTS 550,744  9/56  Belgium.
587,859  1/59  Italy.

CHARLES A. WILLMUTH, *Primary Examiner.*